(12) United States Patent
Rosu et al.

(10) Patent No.: US 10,929,383 B2
(45) Date of Patent: Feb. 23, 2021

(54) METHOD AND SYSTEM FOR IMPROVING TRAINING DATA UNDERSTANDING IN NATURAL LANGUAGE PROCESSING

(71) Applicant: INTERNATIONAL BUSINESS MACHINES CORPORATION, Armonk, NY (US)

(72) Inventors: Daniela Rosu, Ossining, NY (US); Daniel Scanteianu, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 315 days.

(21) Appl. No.: 15/674,604

(22) Filed: Aug. 11, 2017

(65) Prior Publication Data

US 2019/0050443 A1    Feb. 14, 2019

(51) Int. Cl.
| | | |
|---|---|---|
| *G06F 16/00* | (2019.01) | |
| *G06F 16/23* | (2019.01) | |
| *G06N 7/00* | (2006.01) | |
| *G06N 20/00* | (2019.01) | |
| *G06F 16/245* | (2019.01) | |
| *G06F 40/30* | (2020.01) | |
| *G06F 40/295* | (2020.01) | |

(52) U.S. Cl.
CPC ........ *G06F 16/2365* (2019.01); *G06F 16/245* (2019.01); *G06F 40/295* (2020.01); *G06F 40/30* (2020.01); *G06N 7/005* (2013.01); *G06N 20/00* (2019.01)

(58) Field of Classification Search
CPC .. G06F 16/2365; G06F 16/245; G06F 17/278; G06F 17/2785; G06N 20/00; G06N 7/005
See application file for complete search history.

(56) References Cited

U.S. PATENT DOCUMENTS

| | | | |
|---|---|---|---|
| 9,292,262 B2 | 3/2016 | Gabel et al. | |
| 9,594,542 B2 | 3/2017 | Gabel et al. | |
| 10,460,035 B1* | 10/2019 | McNair | ................... G06F 40/30 |
| 2005/0144187 A1* | 6/2005 | Che | ......................... G10L 15/22 |
| 2012/0215727 A1* | 8/2012 | Malik | .................. G06K 9/6259 |
| | | | 706/12 |
| 2012/0254143 A1* | 10/2012 | Varma | ................... G06F 16/243 |
| | | | 707/706 |
| 2012/0254333 A1* | 10/2012 | Chandramouli | ........ G06F 17/27 |
| | | | 709/206 |
| 2013/0159000 A1* | 6/2013 | Ju | ....................... G10L 15/1822 |
| | | | 704/254 |

(Continued)

OTHER PUBLICATIONS

Google Search (Year: 2015).*

(Continued)

*Primary Examiner* — Mark D Featherstone
*Assistant Examiner* — Kweku William Halm
(74) *Attorney, Agent, or Firm* — Anthony M. Pallone

(57) ABSTRACT

A method for natural language processing. Invalid data comprised of one of training data and query data is detected by a computer system. An invalidity level of the invalid data is determined by the computer system. In response to determining that the invalidity level meets predefined criteria, the computer system generates a revision recommendation based on the predefined criteria that are met. The revision recommendation is displayed for implementation and confirmation of the implementation.

12 Claims, 8 Drawing Sheets

(56) References Cited

U.S. PATENT DOCUMENTS

| | | | |
|---|---|---|---|
| 2014/0172417 A1* | 6/2014 | Monk, II | G06F 40/30 |
| | | | 704/9 |
| 2014/0380286 A1 | 8/2014 | Gabel et al. | |
| 2014/0380285 A1 | 12/2014 | Gabel et al. | |
| 2015/0100943 A1 | 4/2015 | Gabel et al. | |
| 2017/0039188 A1 | 2/2017 | Allen et al. | |
| 2018/0165554 A1* | 6/2018 | Zhang | G06K 9/6256 |

OTHER PUBLICATIONS

Johnston et al. "Taming Recognition Errors using a Multimodal Interface" p. 1-7 (Year: 2015).*

Heidloff, "Running the Spark Recommendations Sample on Bluemix", Printed on Jul. 13, 2017, 2 Pages, http://heidloff.net/article/machine-learning-movie-recommendations.

Figueroa, et al., "Active learning for clinical text classification: is it better than random sampling?", Journal of American Medical Informatics Association: JAMIA, 19(5), Oct. 20, 2011, pp. 809-816, Salt Lake City, UT.

Wikipedia, "Sensitivity and Specificity", Printed on Aug. 9, 2017, 7 Pages, http://en.wikipedia.org/wiki/Sensitivity_and_Specificity.

Tong, et al. "Support Vector Machine Active Learning with Applications to Text Classification", Journal of Machine Learning Research 2001, Mar. 1, 2002, pp. 45-66, vol. 2, JMLR.org, ISSN:1532-4435.

Bar-Yossef, et al., "Context Sensitive Query Auto-Completion", WWW 2011—Session Query Analysis, Mar. 28-Apr. 1, 2011, pp. 107-116, World Wide Web Conference Committee (IW3C2), ACM 978-1-4503-0632-4/11/03, Hyderabad, India.

Luis, "Language Understanding Intelligent Service", Printed on Jul. 13, 2017, 4 Pages, http://www.luis.ai/home/index.

Anonymously; "Real Time Visual Recommendations"; http://ip.com/IPCOM/000226009D; Mar. 20, 2013, 4 Pages.

Anonymously; "Automation Framework Based Scripts Visualization and Recommendation"; http://ip.com/IPCOM/000248895D; Jan. 20, 2017, 7 Pages.

Anonymously; "Using Visual Real Estate as an Input to a Visualization Recommendation System"; http://ip.com/IPCOM/000240336D; Jan. 23, 2015, 6 Pages.

Adomavicius, et al., "Towards the Next Generation of Recommender Systems: A Survey of the State-of-the-Art and Possible Extensions", IEEE Transactions on Knowledge and Data Engineering, Jun. 2005, pp. 734-749, IEEE Journals and Magazines, vol. 17, Issue 6, Copyright 2005, IEEE.

Mell et al., "The NIST Definition of Cloud Computing", NIST, Sep. 2011, pp. 1-3, Special Publication 800-145, U.S. Department of Commerce, Gaithersburg, MD.

* cited by examiner

METHOD AND SYSTEM FOR IMPROVING TRAINING DATA UNDERSTANDING IN NATURAL LANGUAGE PROCESSING

BACKGROUND

The present invention relates generally to the field of natural language processing, and more particularly to the management of interpretation precision in natural language understanding.

Natural language processing may be used to analyze text in order to extract useful data and information relating to, for example, various concepts, entities, keywords, categories, sentiment, emotion, relations, semantic roles, and the like. Natural language processing may be applied in performing tasks such as automatic text summarization, text classification, sentiment analysis, topic extraction, named entity recognition, parts-of-speech tagging, and relationship extraction, among others. The precise application of natural language processing relies on the use of precisely trained natural language understanding models.

SUMMARY

Embodiments of the present invention are directed to a method, system, and computer program product for reducing interpretation error in and by a natural language understanding model. Invalid data comprised of one of training data and query data is detected. An invalidity level of the invalid data is determined. In response to determining that the invalidity level meets predefined criteria, a revision recommendation based on the predefined criteria that are met is generated. The revision recommendation is displayed for implementation and confirmation of the implementation.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
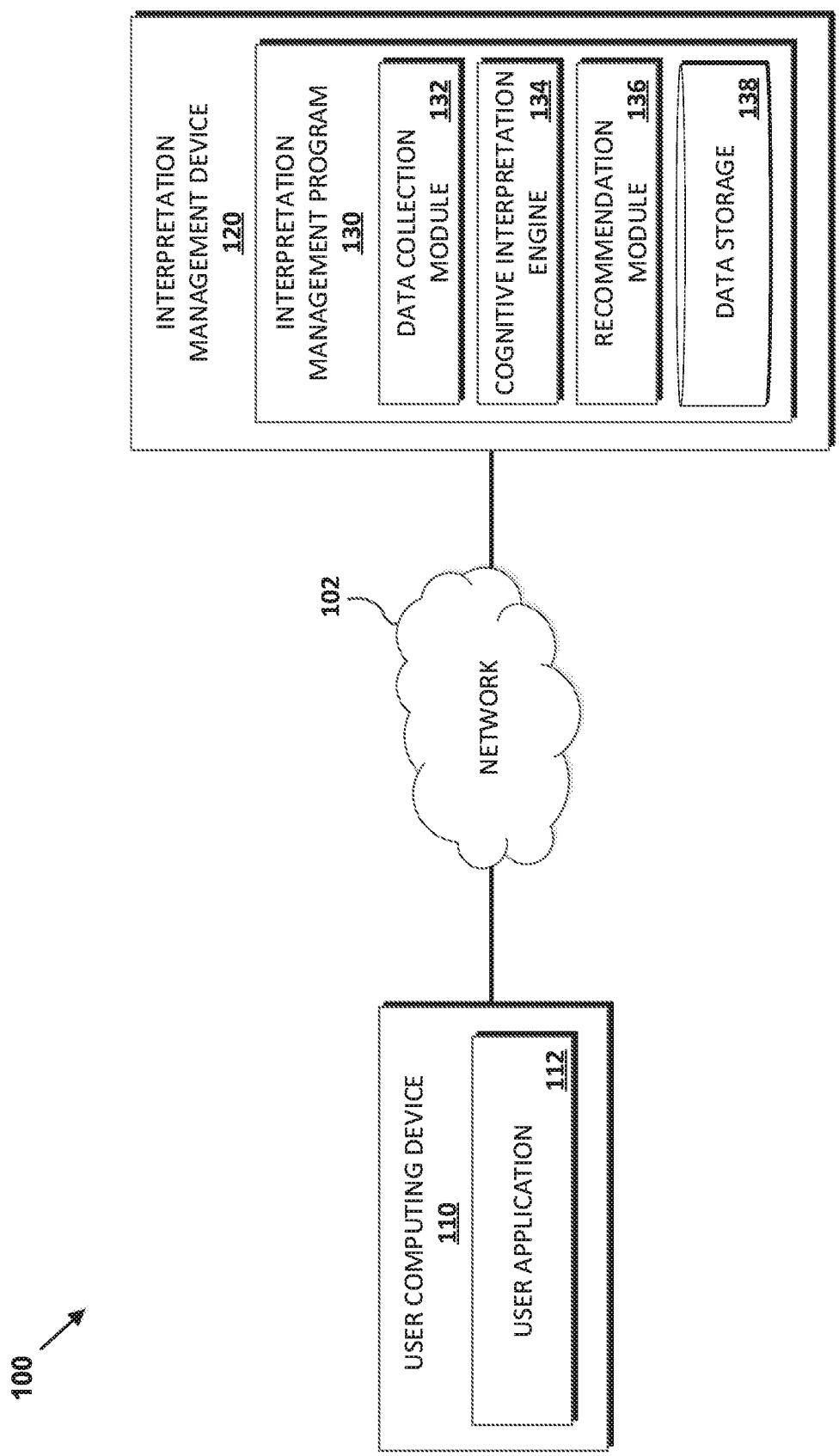
FIG. 1 is a functional block diagram depicting an interpretation management system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Existing supervised learning techniques for natural language understanding models foster a trial-and-error approach to improving interpretation precision, or reducing interpretation error, which can be time consuming and costly. In typical solutions, models are trained and validated with, for example, sample or surrogate questions and their matching answers or artifacts. In order to improve precision in a model, subject matter experts or business analysts must understand sources of error with good enough detail to guide a relevant fix, or the fix may negatively affect or compound other sources of error in the model.

Embodiments of the present invention are directed to an interpretation management system and method for reducing interpretation error in and by a natural language understanding model, based on training data used to train the natural language understanding model. Invalid data of the training data or query data may be detected. An invalidity level of a constituent or subconstituent of the invalid data may be determined. Where the invalidity level meets predefined criteria, a revision recommendation may be generated. The revision recommendation may be implemented by a user to reduce interpretation error in or by the natural language understanding model.

Advantageously, the revision recommendation according to the present disclosure may be applied to efficiently reduce interpretation error in natural language understanding models, by enabling targeted improvements in precision of training data used to train the natural language understanding models. The revision recommendation may be systematically applied, for example, by technical specialists, easing the task of assembling semantically accurate training data. The revision recommendation according to the present disclosure may also be applied to reduce interpretation error by the natural language understanding models, by enabling the models to better leverage the training data used to train the models. The revision recommendation may be applied, for example, by end users of a natural language processing system based on a natural language understanding model trained according to the present disclosure, enabling the models to return precise and relevant results in response to, for example, search queries and the like. To that end, embodiments of the present invention have the capacity to improve the technical field of cognitive computing, and more particularly, natural language processing, by addressing the natural language processing centric issue of precisely and accurately training and using natural language understanding models, both efficiently and effectively.

FIG. 1 is a functional block diagram depicting interpretation management system 100, in accordance with an embodiment of the present invention. Interpretation management system 100 may include user computing device 110 and interpretation management device 120, interconnected by way of network 102. While FIG. 1 depicts 2 discrete devices in interpretation management system 100, other arrangements may be contemplated, for example, user computing device 110 and interpretation management device 120 may be the same device.

In various embodiments of the present invention, network 102 represents an intranet, a local area network (LAN), or a wide area network (WAN) such as the Internet, and may include wired, wireless, or fiber optic connections. In general, network 102 may be any combination of connections and protocols that may support communications between user computing device 110 and interpretation management device 120, in accordance with embodiments of the present invention. In the various embodiments, network 102 may be the Internet, representative of a worldwide collection of networks and gateways that may support communications between devices connected to the Internet.

In various embodiments of the present invention, user computing device 110 and interpretation management device 120 represent individual computing platforms such as a laptop computer, a desktop computer, or a computer server. In the various embodiments, user computing device 110 or interpretation management device 120 may otherwise be any other type of computing platform, computing system, or information system capable of receiving and sending data to and from another device, by way of network 102. User computing device 110 or interpretation management device 120 may include internal and external hardware components, as depicted and described with reference to FIG. 4. In other embodiments, user computing device 110 or interpretation management device 120 may be implemented in a cloud computing environment, as depicted and described with reference to FIGS. 5 and 6.

User computing device 110 represents a computing platform that may host one or more software programs, such as user application 112. User application 112 may be a program, one or more subroutines contained in a program, an application programming interface, or the like, that communicates with interpretation management program 130 residing on interpretation management device 120. In various embodiments of the present invention, user application 112 may include and implement a combination of devices and technologies, such as input devices and corresponding device drivers, to provide a platform to enable a user of user computing device 110 to communicate and interact with interpretation management program 130.

In an embodiment of the present invention, user application 112 may receive training data input by a user, which may define, for example, desired constituent classification pairings or relationships. In the embodiment, user application 112 may subsequently display a training data revision recommendation based on the received training data, which may be implemented to reduce interpretation error in the natural language understanding model.

In an embodiment of the present invention, the training data may include, for example, labeled input objects such as labeled constituents, and corresponding desired output values such as corresponding classes or classifications. In the embodiment, a labeled constituent represents, for example, a constituent including a specification or mapping as to which classification the constituent may most belong. A constituent may include, for example, a question, a document, a statement, an exclamation, a command, an utterance, an expression, and the like. The constituent may otherwise include text, or a string or set of words, that may be arranged to convey a particular concept, idea, expression, sentiment, and the like. A classification may include, for example, an answer, a category, a topic, a taxonomy, a domain, and the like. Pairs of labeled constituents and corresponding classifications may respectively define the desired constituent classification pairings. In the embodiment, the desired constituent classification pairings may form, for example, labeled training data, labeled training sets, or labeled sets of supervised learning data. In the embodiment, classification groups may respectively be formed, for example, by sets of constituents having the same or similar labels. In an example, a classification group may include a set of constituents of the same category, topic, taxonomy, domain, or the like. In another example, a classification group may include a set of constituents relating to a similar answer. In the embodiment, the desired constituent classification pairings provide, for example, a basis for training the natural language understanding model to map unlabeled constituents to corresponding classifications. In the embodiment, the interpretation error represents, for example, a relative quantification of the likelihood that the natural language understanding model may return an incorrect output value in response to receiving a corresponding input object, based on the training data. In the embodiment, the interpretation error may be based on, for example, invalid data of the training data. In the embodiment, the invalid data may include, for example, mappings of labeled constituents to non-corresponding classifications.

In an embodiment of the present invention, a training data revision recommendation may relate to, for example, one or more constituents of the training data that may contribute to the interpretation error in the natural language understanding model during end-use. In the embodiment, the training data revision recommendations may include, for example, identifications and descriptions of one or more of the constituents or subconstituents that may potentially contribute to the interpretation error in the natural language understanding model, if used to train the model. In the embodiment, the training data revision recommendations may further include, for example, corresponding solutions to mitigate the risk, as well as corresponding quantifications of the risk.

In various embodiments of the present invention, user application 112 may later receive query data input by a user, which may be processed by a natural language processing system based on the natural language understanding model. In the various embodiments, user application 112 may subsequently display a query data revision recommendation based on the received query data, which may be implemented to reduce the interpretation error by the natural language understanding model.

In various embodiments of the present invention, the query data may include, for example, unlabeled input objects such as in the form of one or more unlabeled constituents. In the various embodiments, an unlabeled constituent represents, for example, an unspecified constituent to be mapped to the classification with which the constituent may most belong. In the various embodiments, a query data revision recommendation may relate to, for example, one or more constituents or subconstituents of the query data that may contribute to the interpretation error by the natural language understanding model during end-use. In the various embodiments, the query data revision recommendations may include, for example, identifications and descriptions of one or more of the constituents or subconstituents that may potentially contribute to the interpretation error by the natural language understanding model, if submitted for processing by the natural language processing system. In the various embodiments, the query data revision recommendations may also include, for example, corresponding solutions to mitigate the risk, as well as corresponding quantifications of the risk.

Interpretation management device 120 represents a computing platform that may host one or more software programs, such as interpretation management program 130. Interpretation management program 130 may be a program, one or more subroutines contained in a program, an application programming interface, or the like, that communicates with user application 112 residing on user computing device 110. Interpretation management program 130 may include data collection module 132, cognitive interpretation engine 134, recommendation module 136, and data storage 138.

Data collection module 132 represents functionality of interpretation management program 130 that communicates with user application 112 to receive data. In an embodiment of the present invention, the received data may include the training data or the query data. Data collection module 132 subsequently stores the received data in data storage 138, for later retrieval and use. The received data may be stored in the form of, for example, separate computer-readable data files.

Cognitive interpretation engine 134 represents functionality of interpretation management program 130 that receives the data files to detect invalid data. In various embodiments of the present invention, cognitive interpretation engine 134 may mine the received data files to detect invalid data of the training data or the query data. In the various embodiments, cognitive interpretation engine 134 may determine an invalidity level of a constituent or subconstituent, based on the detected invalid data. In the various embodiments, cognitive interpretation engine 134 may determine an interpretation error risk level based on each invalidity level that meets predefined criteria.

Cognitive interpretation engine 134 mines the received data files to detect the invalid data. In various embodiments of the present invention, cognitive interpretation engine 134 may mine the data using, for example, various data miners, data crawlers, data parsers, deep-grammar parsers, and the like. Cognitive interpretation engine 134 implements algorithms and techniques based on various machine learning models, classification models, association rule learning models, clustering models, natural language models, statistical models, probabilistic models, and the like, to represent and detect the data. In the various embodiments, the algorithms may include those based on, for example, n-gram language models, bag-of-words models, naïve Bayes classification models, maximum entropy classification models, support vector machines, decision trees, Random Forests, multilayer perceptrons, hidden Markov models, density estimation models, exponential language models, neural language models, continuous space language models, positional language models, vector-space meaning models, and the like, to detect the invalid data. Cognitive interpretation engine 134 is trained based on training data that is input to the cognitive security engine, in accordance with the aforementioned tasks and models. The appropriate choice of the training data and the models may be chosen as a matter of design choice, based, for example, on a given application at-hand.

In the various embodiments, cognitive interpretation engine 134 may mine the data to detect the invalid data, that may be indicative of a potential interpretation error which may serve to contribute to interpretation error in and by the natural language understanding model.

In an embodiment of the present invention, the invalid data of the training data may include, for example, constituents and subconstituents of the training data that may incorrectly, improperly, or otherwise inconsistently define particular constituent classification pairings of the desired constituent classification pairings. In an example, a particular constituent classification pairing may include a mapping of a labeled constituent to an incorrect, improper, or otherwise non-corresponding classification. In the example, the incorrect mapping may be a result of one or more subconstituents of the labeled constituent that may resemble constituents or subconstituents of the non-corresponding classification. The incorrect mapping may reduce interpretation error in the natural language understanding model. In the embodiment, the particular constituent classification pairings form, for example, a basis for training the natural language understanding model to improperly map unlabeled constituents to corresponding classifications. In the embodiment, the particular constituent classification pairings may otherwise form, for example, a basis for training the natural language understanding model to map unlabeled constituents to non-corresponding classifications. In the embodiment, the invalid data of the training data may contribute to interpretation error in the natural language understanding model, and may be representative of the predefined interpretation criteria.

In various embodiments of the present invention, the invalid data of the query data may include, for example, constituents or subconstituents of the query data that may be unrecognized, unfamiliar, or otherwise unknown to the natural language understanding model, based on training data used to train the model. For example, the constituents or subconstituents of the query data may not resemble those of the training data used to train the natural language understanding model. In the various embodiments, the lack of resemblance may be caused by, for example, constituents or subconstituents of the query data that fall outside the scope of the desired constituent classification pairings. In the various embodiments, the invalid data of the query data may contribute to interpretation error by the natural language understanding model, and may be representative of the predefined interpretation criteria.

The invalid data of the training data or the query data includes one or more constituents and subconstituents that can potentially contribute to the interpretation error in or by the natural language understanding model, respectively. In an embodiment of the present invention, the subconstituents may include, for example, one or more n-grams. An n-gram may be a set of n items from a given sequence of text or speech, where a number of the n items may respectively describe a size of the n-gram. In the embodiment, an n-gram of n items may include, for example, n phonemes, n syllables, n letters, n words, n base pairs, and the like. For example, an n-gram of size 1, referred to in the art as a "1-gram sequence" or a "unigram," may include one phoneme, one syllable, one letter, one word, or one base pair; an n-gram of size 2, referred to in the art as a "2-gram sequence" or a "bigram," may include two phonemes, two syllables, two letters, two words, or two base pairs, and so on. The particular choice of form of the one or more n-grams, such as with respect to the size, may be chosen as a matter of design choice, based, for example, on a given application at-hand. In the embodiment, the one or more n-grams may be, for example, mined, or otherwise collected, from the training data and the query data, respectively.

Cognitive interpretation engine 134 mines the training data or the query data to collect the one or more n-grams, in order to detect the invalid data. In an embodiment of the present invention, cognitive interpretation engine 134 may mine the training data with respect to the desired constituent classification pairings or the classification groups, to detect the invalid data in terms of the one or more n-grams. In the embodiment, the detected invalid data may include, for example, identical subconstituents of two or more labeled constituents which may include one or more identical n-grams. The labeled constituents may be received as part of the training data. In the embodiment, the one or more identical n-grams may each include, for example, identical sequences of n items. For example, one or more of the identical n-grams may include identical sequences of 2 words, forming a 2-gram sequence such as in the form of "to be," or may include identical sequences of 3 words, forming a 3-gram sequence such as in the form of "not to be," and so on. The identical n-grams may appear in two or more classifications, corresponding to the two or more constituents, respectively. In an example, certain identical subconstituents may represent identical phrases of two distinct utterances that respectively appear in two distinct classification groups.

In an embodiment of the present invention, the detected invalid data may include, for example, a unique subconstituent of a single constituent which may include one or more unique n-grams. The labeled constituents may be received as part of the training data. In the embodiment, the one or more unique n-grams may each include, for example, one or more unique sequences of n items. In an example, a certain unique subconstituent of a constituent may include a unique n-gram including a unique sequence of 4 words, forming a 4-gram sequence such as in the form of "or not to be," which may only appear in the classification group of the constituent. In the example, the certain unique subconstituent may represent a unique phrase of an utterance that appears only in the classification group of the utterance.

In various embodiments of the present invention, the detected invalid data may include, for example, an unknown subconstituent of an unlabeled constituent, which may include one or more unknown n-grams. The unlabeled constituent may be received as part of the query data. In the various embodiments, the one or more unknown n-grams may each include, for example, unknown or distinct sequences of n items, with respect to the n-grams of the training data used to train the model. For example, one or more of the unknown n-grams may include an unknown sequence of 1 word, forming a 1-gram sequence such as in the form of "soliloquy," which may not appear in the training data.

Cognitive interpretation engine 134 determines an invalidity level of a constituent or subconstituent, based on the detected invalid data. In various embodiments of the present invention, the invalidity level represents, for example, an indication as to a type and extent of interpretation error that may be caused in or by the natural language understanding model, by the training data or the query data, respectively. In the various embodiments, the invalidity level may be quantified based on associated n-grams of respective constituents and subconstituents. The invalidity level may be used, for example, as a metric in providing a likelihood that the model may return an incorrect output value in response to receiving a corresponding input object. In the various embodiments, the invalidity level may be associated, for example, with one or more constituents, or one or more respective subconstituents thereof. In the various embodiments, invalidity levels may include, for example, ambiguity levels, bias levels, and misclassification levels.

In an embodiment of the present invention, the invalidity level may be defined in terms of, for example, quantitative measures that may be computed with respect to either of the identical subconstituents of the two or more constituents, or the classification groups, based on one or more corresponding identical n-grams. In the embodiment, the invalidity level may include, for example, an ambiguity level and a bias level. In the embodiment, an identical subconstituent may be indicative of a source of potential interpretation error that may produce interpretation ambiguity, with respect to two or more labeled constituents and respective classification groups thereof. In the embodiment, the identical subconstituent may otherwise be indicative of a source of potential interpretation error that may produce interpretation bias, with respect to the two or more labeled constituents and respective classification groups thereof. The quantitative measures may be used to determine corresponding ambiguity levels or bias levels that may be caused by the desired constituent classification pairings with respect to the classification groups, as a result of one or more of the identical n-grams of the two or more constituents. The quantitative measures may be used to determine a relative likelihood that the two or more constituents have been respectively labeled as such, given that the identical subconstituent appears in the two or more labeled constituents. For example, identical n-grams may cause corresponding constituents to appear similar semantically, contextually, or the like, when they may not be. In the embodiment, the ambiguity levels and the bias levels may be computed as a function of two or more labeled constituents, their corresponding classifications, and identical subconstituents of the respective two or more labeled constituents. In the embodiment, the ambiguity levels and the bias levels may respectively describe, for example, relative levels of ambiguity or bias that may be caused by the identical subconstituents of the two or more constituents, with respect to the corresponding classifications. In the embodiment, the quantitative measures may be used to determine invalidity levels corresponding to the two or more constituents or the identical subconstituents, with respect to the corresponding classification groups.

The quantitative measures may assess strength levels, as described in further detail below, with respect to each identical subconstituent of the desired constituent classification pairings in determining potential causes of ambiguity levels or bias levels, respectively. In an example, the ambiguity levels may be a result of identical phrases of differing utterances that appear in distinct classification groups, where each of the identical phrases may be representative of their respective classification groups due to respective strength levels of the identical phrases. In the example, the identical phrases may obscure distinctions between the distinct classification groups. In an other example, the bias levels may be caused by identical phrases of differing utterances that appear in distinct classification groups, where one of the distinct classification groups may include a phrase of the identical phrases that has a high strength level, relative to those of other of the distinct classification groups. In the other example, the phrase having the high strength level may cause its corresponding classification group to always receive mapped constituents over other of the distinct classification groups.

In an embodiment of the present invention, the invalidity level may include, for example, quantitative measures that may respectively be computed with respect to one or more subconstituents of single constituents, based on one or more n-grams. The subconstituents may be, for example, unique subconstituents. In the embodiment, the invalidity level may include, for example, a misclassification level. In the embodiment, a unique subconstituent may be indicative of a source of potential interpretation error that may misrepresent a respective classification group thereof. As a result, the misrepresented classification group may cause a misclassification error. The quantitative measures may be used to determine corresponding misclassification levels that may be produced with respect to the desired constituent classification pairings or the classification groups, as a result of one or more of the n-grams of the single constituents. For example, a unique n-gram may cause a corresponding single constituent to misrepresent its classification group. In the embodiment, the misclassification levels may be computed, for example, as a function of a single labeled constituent, its corresponding classification, and a unique subconstituent of the single labeled constituent. In the embodiment, the misclassification levels may describe relative levels of, for example, misclassification that may be caused by the unique subconstituent of the single constituent, with respect to a corresponding classification group of the single constituent. In the embodiment, the quantitative measures may be used to determine invalidity levels corresponding to the single constituent or the unique subconstituent, with respect to a corresponding classification group or one or more desired constituent classification pairings.

In various embodiments of the present invention, cognitive interpretation engine 134 may mine the query data with respect to the training data used to train the natural language understanding model, to detect the invalid data in terms of the one or more n-grams. In the various embodiments, the invalidity level may be defined in terms of, for example, quantitative measures that may be computed with respect to unknown subconstituents of one or more unlabeled constituents, based on one or more of the unknown n-grams. In the various embodiments, the invalidity level may include, for example, a discrepancy level. In the various embodiments, an unknown subconstituent may be indicative of a source of potential interpretation error that may produce interpretation discrepancy, with respect to the unlabeled constituent and the training data. The quantitative measures may be used to determine corresponding discrepancy levels that may be produced with respect to the desired constituent classification pairings, as a result of one or more of the unknown n-grams of the unlabeled constituents. For example, unknown n-grams may be incompatible with the desired constituent classification pairings, causing a lack of bases by which the model may correctly map corresponding constituents of the unknown n-grams. In the various embodiments, the discrepancy levels may be computed as a function of one or more of the unlabeled constituents, one or more labeled constituents of the training data, their corresponding classifications, and one or more subconstituents of each of the unlabeled and labeled constituents, respectively. In the various embodiments, the discrepancy levels may describe relative levels of, for example, incompatibility that may be caused by the one or more unknown subconstituents of the unlabeled constituents, with respect to those of the labeled constituents. In the embodiment, the quantitative measures may be used to determine invalidity levels corresponding to the unlabeled constituent or the one or more unknown subconstituents, with respect to those of the labeled constituents.

Cognitive interpretation engine 134 determines an interpretation error risk level for each invalidity level that meets predefined criteria. The interpretation error risk level may represent an ambiguity level, a bias level, a misclassification level, or a discrepancy level. In various embodiments of the present invention, the interpretation error risk level represents, for example, a relative quantification of the likelihood that constituents or subconstituents of the training data or the query data may contribute to interpretation error in or by the natural language understanding model, respectively. In the various embodiments, the interpretation error risk level may be quantified, for example, based on a corresponding invalidity level that meets predefined criteria. In the various embodiments, the predefined criteria may define, for example, particular levels of ambiguity, bias, misclassification, and discrepancy, respectively, that may reduce interpretation error.

Recommendation module 136 represents functionality of interpretation management program 130 that receives the invalidity levels and interpretation error risk levels of associated constituents and subconstituents to generate respective revision recommendations. In an embodiment of the present invention, recommendation module 136 may generate, for example, the training data revision recommendations relating to one or more constituents or subconstituents of the training data that may contribute to the interpretation error in the natural language understanding model. In various embodiments, recommendation module 136 may generate, for example, the query data revision recommendations relating to one or more constituents or subconstituents of the query data that may contribute to the interpretation error by the natural language understanding model. In various embodiments, the revision recommendations may be displayed for implementation.

In an embodiment of the present invention, the training data revision recommendations may quantify the expected improvement of interpretation associated with particular constituents or subconstituents of the training data. In the embodiment, the quantifications of expected interpretation improvement may represent, for example, a reduction of error count causable by the training data, relative to a particular test set, after implementation of the recommendations. For example, the quantifications of expected interpretation improvement may include a relative count of errors, relating to incorrectly mapped constituents caused by the training data, both before and after the recommendations are implemented. In the embodiment, the quantifications of expected interpretation improvement may include, for example, a ratio of the error count before implementation of the recommendations, to the error count after implementation of the recommendations.

In various embodiments of the present invention, the training data revision recommendations and the query data revision recommendations may be, for example, confirmed or implemented by the user, for application with respect to the training data or the query data, respectively. In an example, the training data revision recommendations may include suggestions as to deletion or revision of specific text constructs forming certain of the desired constituent classification pairings, to reduce the interpretation error in the natural language understanding model that may be caused by the text constructs. The training data revision recommendations may take into account the effects the suggestions may have on each of the other desired pairings, thereby allowing for targeted and efficient reduction in interpretation error, in and by the model, while also preventing the introduction of new errors into the model as a result. In another example, the query data revision recommendations may include suggestions as to revision of specific text constructs forming a corresponding query, to reduce the interpretation error by the model that may be caused by the text constructs, thereby allowing for a desired result to be returned in response to the query. By revising the training data and the query data as such, potential sources of confusion that may affect the model may be eliminated, or at least reduced. To that end, embodiments of the present invention allow natural language understanding models to provide more relevant results in response to received queries from users.

Figure 2A:
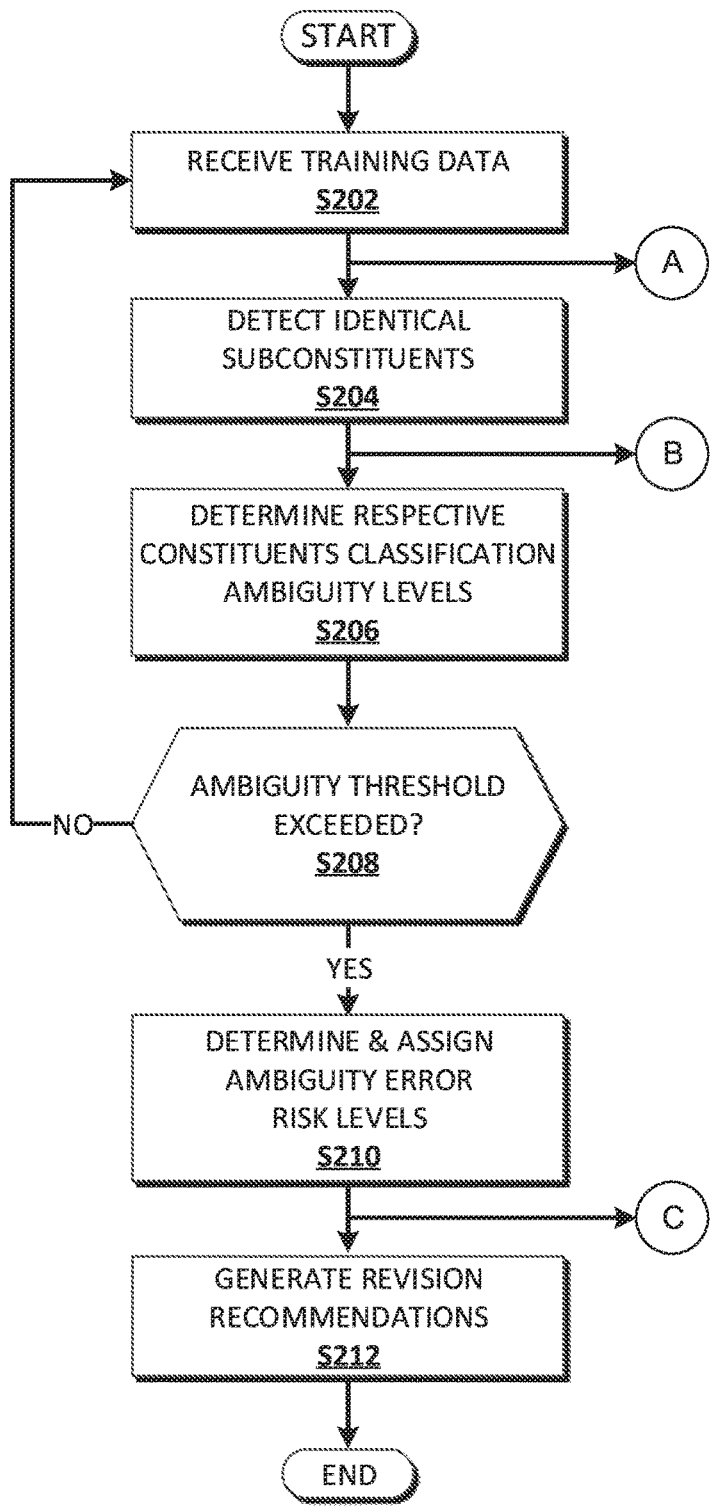
FIGS. 2A, 2B, and 2C are a flowchart depicting the operational steps of an aspect of interpretation management system of FIG. 1, in accordance with an embodiment of the present invention.
Figure 2B:
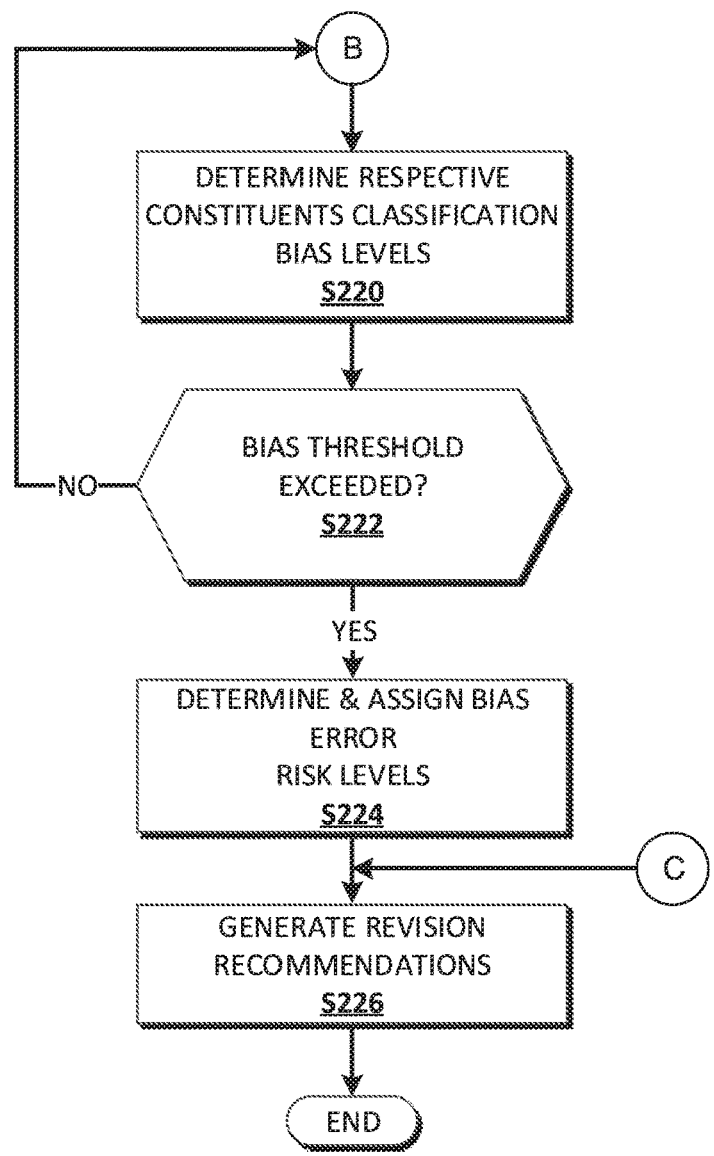
Figure 2C:
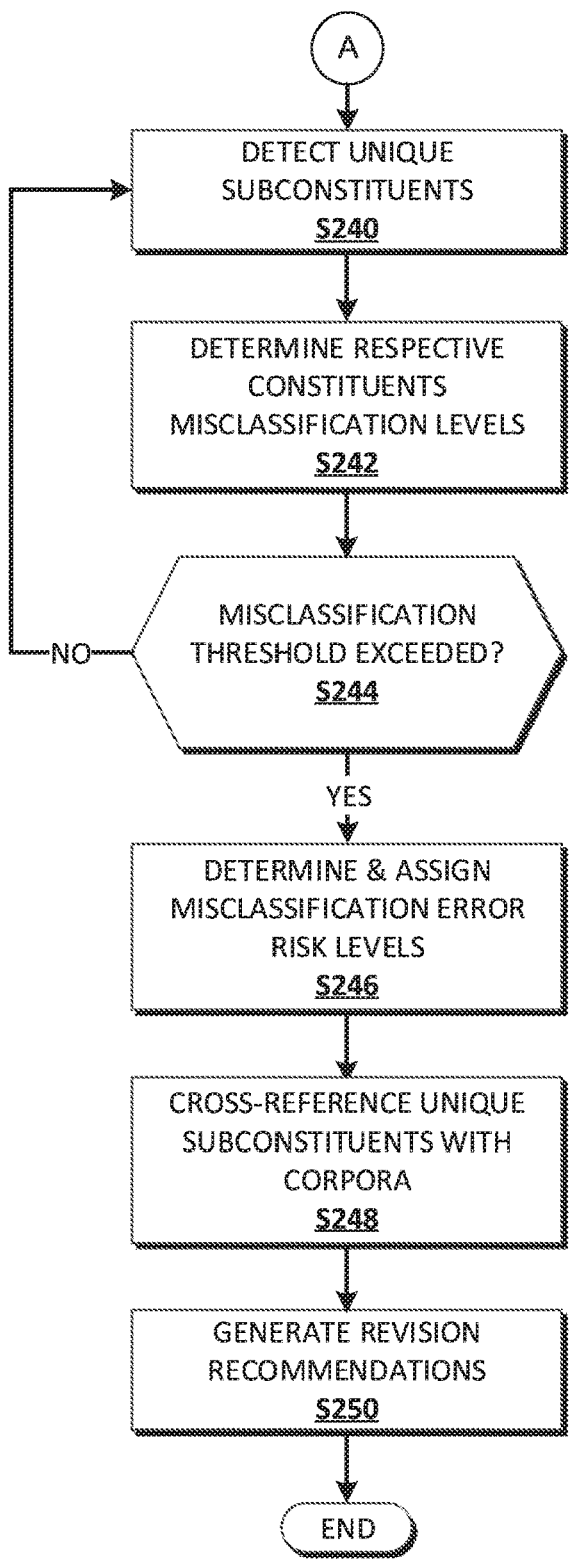

FIGS. 2A, 2B, and 2C are a flowchart depicting the operational steps of an aspect of interpretation management system 100 of FIG. 1, in accordance with an embodiment of the present invention.

At step S202, data collection module 132 of interpretation management program 130 receives the data from user application 112. The received data may include the training data, which may include the desired constituent classification pairings, as previously described.

At step S204, cognitive interpretation engine 134 of interpretation management program 130 mines the received data files to detect the invalid data.

At step S206, cognitive interpretation engine 134 of interpretation management program 130 determines ambiguity levels of constituents or subconstituents, based on the detected invalid data, as previously described. More particularly, each classification of the desired constituent classification pairings represents a particular domain of closely-related concepts, where the related concepts may be represented by corresponding constituents of each of the classifications. One or more of the constituents may include representative subconstituents that best represent the particular domain of closely-related concepts. In various embodiments of the present invention, one or more of the representative subconstituents of each of the classifications may include, for example, one or more n-grams that best represent the particular domain. The one or more n-grams may include, for example, n corresponding words. In the various embodiments, the one or more n-grams of the representative subconstituents may include a string of $n_{max}$ words, with respect to the its corresponding classification. For example, a representative subconstituent including a string of $n_{max}$ words may include a largest or longest string of collocated or juxtaposed words, relative to other subconstituents of the same classification. In the various embodiments, a representation strength level ("strength level") may be assessed and assigned to representative subconstituents, which may include an indication as to how precisely and correctly a representative subconstituent may reflect concepts of a corresponding constituent or classification. The strength level can be computed for a particular representative subconstituent with respect to a corresponding classification, for example, as a conditional probability of the particular representative subconstituent being assigned to the corresponding classification. The strength level can also be computed for a constituent of which the particular representative subconstituent forms a part, with respect to the corresponding classification. In the various embodiments, strength levels may be computed for subconstituents, and the subconstituents may subsequently be indexed by corresponding strength level. The appropriate choice of the particular computation performed in determining the strength level may be chosen as a matter of design choice, based, for example, on a given application at-hand.

In an embodiment of the present invention, at step S206, cognitive interpretation engine 134 may implement, for example, various naïve Bayes classification models in conjunction with n-gram language models to determine the ambiguity levels. An ambiguity level can be computed and determined as a function of two or more labeled constituents, their corresponding classifications, and identical subconstituents of the respective two or more labeled constituents. In the embodiment, the ambiguity level may be computed, for example, where two identical subconstituents include representative subconstituents that best represent their respective classifications, to closely varying degrees. In the embodiment, the ambiguity levels may be computed, for example, as a function of respective strength values of each of the two representative subconstituents with respect to their respective classifications. The representation strength values may be computed as an expression according to Equation 1:

$$RS(s,cl) = \max\{length(s)/length(c)|c \text{ in } cl\} * ln(1+count(\{c \text{ in } cl.|s \text{ occurs in } c\}))$$

where "RS" is the representation strength value, computed as a function of a classification, "cl," and subconstituent, "s"; "length(s)" represents the number of n-grams included in each of the representative subconstituents; "length(c)" represents an associated constituent of the particular representative subconstituent; "c in cl" represents a condition specifying that the associated constituent is in its respective classification; "s occurs in c" represents a condition specifying that the particular representative subconstituent occurs in the associated constituent. In the embodiment, computation may further include, for example, subsequently computing an ambiguity risk value of the representative subconstituent. The ambiguity risk level, with respect to the two representative subconstituents, may then be computed as the ratio of the lesser representation strength value to the higher representation strength value of the two representative subconstituents, respectively.

At step S208, cognitive interpretation engine 134 of interpretation management program 130 determines whether the two representative subconstituents are ambiguous, by determining whether their respective invalidity levels meet predefined criteria corresponding to ambiguity. The invalidity levels may meet the predefined criteria, where a conditional probability that each of two constituents of the training data include respective classification labels, given that the two constituents further include a common and identical subconstituent, exceeds a predetermined threshold value. In the embodiment, the conditional probability may be determined, for example, using Equation 1. The appropriate choice of the predefined criteria and the predetermined threshold value may be chosen as a matter of design choice, based on, for example, a given application at-hand.

At step S210, cognitive interpretation engine 134 of interpretation management program 130 determines and assigns ambiguity levels to each representative subconstituent determined to be ambiguous. In an embodiment of the present invention, cognitive interpretation engine 134 may retrieve and rank each representative subconstituent that may be considered to be ambiguous, according to, for example, values of respectively computed conditional probabilities thereof.

At step S212, recommendation module 136 of interpretation management program 130 receives each representative subconstituent determined to be ambiguous, along with corresponding ambiguity error risk levels, constituents, and classifications thereof, to generate corresponding revision recommendations. In an embodiment of the present invention, the revision recommendations may include, for example, suggestions as to deletion or revision of certain of the subconstituents, such as the representative subconstituents, which may reduce the interpretation error. In the embodiment, the recommendations may include, for example, reducing a length, in terms of n-grams, of certain of the subconstituents or of their corresponding constituents. In the embodiment, the revision recommendations may also include, for example, the quantifications of expected interpretation improvement, as previously described. The appropriate choice of the revision recommendations may be chosen as a matter of design choice, based, for example, on a given application at-hand.

In an embodiment of the present invention, a generated revision recommendation may subsequently be displayed. The revision recommendation may be displayed, for example, by a display of either user computing device 110 or interpretation management device 120. In the embodiment, implementation of the revision recommendation may cause a confirmation to be generated and sent to interpretation management program 130. In the embodiment, interpretation management program 130 may then, for example, repeat the operational steps beginning at step S202, based on the training data with respect to the implemented revision recommendation.

With reference to FIG. 2B, cognitive interpretation engine 134 of interpretation management program 130 determines bias levels of constituents or subconstituents, based on the detected invalid data, as previously described. Similar to that described with reference to step S206 of FIG. 2A, each classification of the desired constituent classification pairings represents a particular domain of closely-related concepts, where the related concepts may be represented by corresponding constituents of each of the classifications.

At step S220, cognitive interpretation engine 134 of interpretation management program 130 may implement, for example, various naïve Bayes classification models and n-gram language models to determine the bias levels. A bias level can be computed and determined as a function of two or more labeled constituents, their corresponding classifications, and identical subconstituents of the respective two or more labeled constituents. In an embodiment of the present invention, the bias level may be computed for the two identical subconstituents, for example, where only one of the corresponding classifications of the two identical subconstituents receive most or all mapped constituents, relative to a test set. In the embodiment, the bias levels may be computed, for example, by computing respective strength levels, according to Equation 1, for each of the two subconstituents, with respect to corresponding classifications thereof. In various embodiments, the bias levels may meet the predefined criteria where conditional probabilities that each of two constituents of the training data include respective classification labels, given that the two constituents further include a common and identical subconstituent, differ in value. In the various embodiments, the two constituents levels may meet the predefined criteria where the determined conditional probability of one of the two constituents exceeds the determined conditional probability of the other. In the embodiment, the conditional probability may be determined, for example, using Equation 1. The appropriate choice of the predefined criteria and the predetermined threshold value may be chosen as a matter of design choice, based on, for example, a given application at-hand.

At step S222, cognitive interpretation engine 134 of interpretation management program 130 determines whether the two respective subconstituents are biased, by determining strength levels of corresponding constituents, with respect to corresponding classifications. In an embodiment of the present invention, cognitive interpretation engine 134 may determine whether the two respective subconstituents are biased if one of the strength levels of the corresponding constituents exceeds that of the other. In the embodiment, the bias level may be directed towards the respective subconstituent of the exceeding strength level constituent.

At step S224, cognitive interpretation engine 134 of interpretation management program 130 determines and assigns bias error risk levels to each respective subconstituent determined to be biased. In an embodiment of the present invention, cognitive interpretation engine 134 may retrieve and rank each respective subconstituent that may be determined to be biased, according to respective bias error risk levels.

At step S226, recommendation module 136 of interpretation management program 130 receives each subconstituent determined to be biased, along with corresponding bias error risk levels, constituents, and classifications thereof, to generate corresponding revision recommendations, as previously described.

With reference to FIG. 2C, cognitive interpretation engine 134 of interpretation management program 130 determines misclassification levels of constituents or subconstituents, based on the detected invalid data, as previously described. Similar to that described with reference to step S206 of FIG. 2A, each classification of the desired constituent classification pairings represents a particular domain of closely-related concepts, where the related concepts may be represented by corresponding constituents of each of the classifications. In an embodiment of the present invention, misclassified constituents may not closely relate to the closely-related concepts.

At step S240, cognitive interpretation engine 134 of interpretation management program 130 may implement, for example, various naïve Bayes classification models and n-gram language models to determine the misclassification levels. A misclassification level can be computed and determined as a function of a single labeled constituent, its corresponding classification, and a unique subconstituent of the single labeled constituent. In an embodiment of the present invention, the misclassification level may be computed for the unique subconstituent, for example, by computing, for the unique subconstituent, with respect to its corresponding classification, a strength level thereof. The misclassification risk level, with respect to the unique subconstituent, may then be computed similarly with respect to that of the ambiguity risk level, as previously described. A misclassification level may be determined with respect to the training data as a conditional probability that a constituent of the training data comprises a classification label, given that the constituent further comprise a unique subconstituent with respect to the training data, wherein the predefined criteria are met where the conditional probability exceeds a predetermined threshold value.

At steps S242 and S244, cognitive interpretation engine 134 of interpretation management program 130 determines whether the unique subconstituent is misclassified. In an embodiment of the present invention, the unique subconstituent may be determined to be misclassified, where the ratio of the representation strength value of the unique subconstituent, with respect to that of a most comparable subconstituent, is equal to a value of 1, and also meet predefined criteria. The appropriate choice of the predefined criteria that are met may be chosen as a matter of design choice, based, for example, on a given application at-hand.

At step S246, cognitive interpretation engine 134 of interpretation management program 130 determines and assigns misclassification error risk levels to each respective subconstituent determined to be likely misclassified. In an embodiment of the present invention, cognitive interpretation engine 134 may retrieve and rank each representative subconstituent that may be considered to be ambiguous, according to respective misclassification error risk levels.

At step S248, cognitive interpretation engine 134 of interpretation management program 130 may optionally cross-reference the unique subconstituent against various corpora. The appropriate choice of the various corpora may be chosen as a matter of design choice, based, for example, on a given application at-hand.

At step S250, recommendation module 136 of interpretation management program 130 receives each unique subconstituent determined to be likely misclassified, along with corresponding misclassification error risk levels, constituents, and classifications thereof, to generate corresponding revision recommendations, as previously described.

Figure 3:
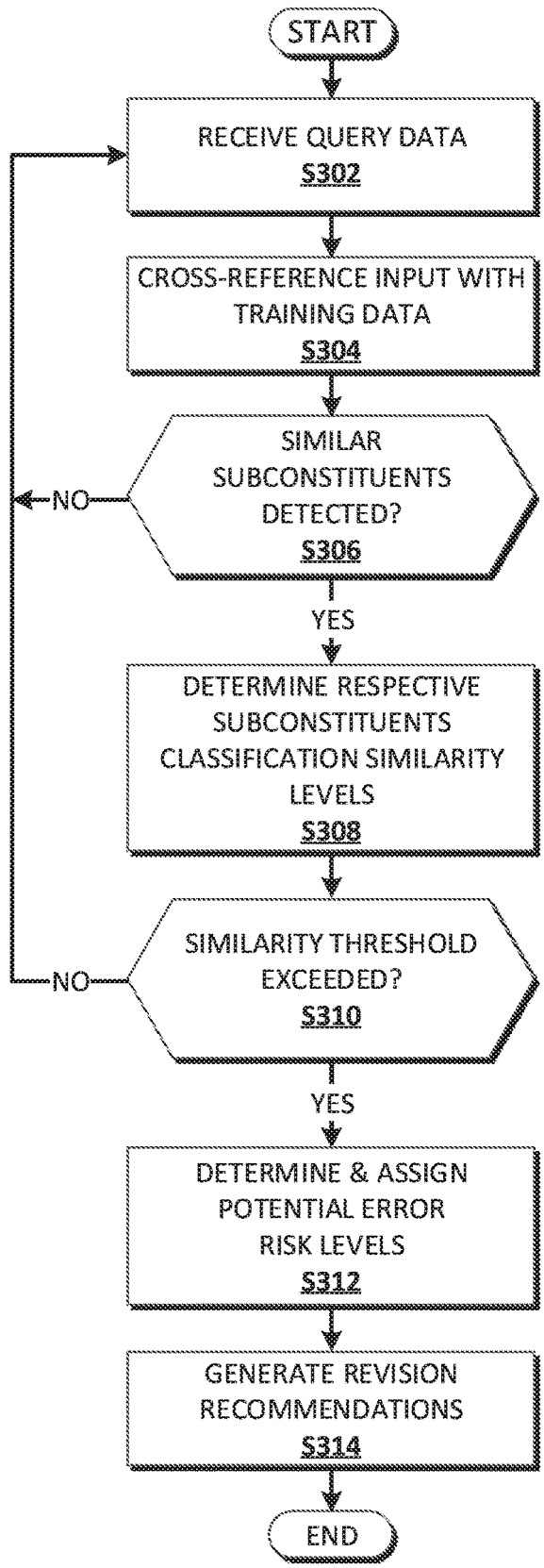
FIG. 3 is a flowchart depicting the operational steps of an aspect of the interpretation management system of FIG. 1, in accordance with an embodiment of the present invention.

FIG. 3 is a flowchart depicting the operational steps of an aspect of interpretation management system 100 of FIG. 1, in accordance with an embodiment of the present invention. Cognitive interpretation engine 134 has been trained prior to the occurrence of the operational steps.

At step S302, data collection module 132 of interpretation management program 130 receives the data from user application 112. The received data may include the query data, which may include the one or more unlabeled constituents, as previously described.

At step S304, cognitive interpretation engine 134 of interpretation management program 130 mines the received data files to detect the invalid data, as previously described. Cognitive interpretation engine 134 cross-references the detected invalid data with the training data.

At step S306, cognitive interpretation engine 134 of interpretation management program 130 determines whether or not one or more of the unlabeled constituents includes one or more unknown subconstituents, as previously described. Where one or more unknown subconstituents are detected, cognitive interpretation engine 134 proceeds to step S314, as described in further detail below.

At step S308, cognitive interpretation engine 134 of interpretation management program 130 may implement, for example, various naïve Bayes classification models and n-gram language models to determine similarity levels of subconstituents of the unlabeled constituents of the query data, with respect to those of the training data. The similarity levels may be determined in a manner similar to that of the ambiguity levels, excepting differences relating to the use of respective, and not representative, subconstituents.

At step S310, cognitive interpretation engine 134 of interpretation management program 130 determines whether two similar subconstituents of the query data and the training data, respectively, are similar beyond a predetermined threshold value. The appropriate choice of a particular predetermined threshold value may be chosen as a matter of design choice, based, for example, on a given application at-hand.

At step S312, cognitive interpretation engine 134 of interpretation management program 130 determines and assigns similarity levels to each respective subconstituent determined to be similar. In an embodiment of the present invention, cognitive interpretation engine 134 may retrieve and rank each respective subconstituent that may be considered to be similar, according to respective similarity levels thereof.

At step S314, recommendation module 136 of interpretation management program 130 receives each respective subconstituent determined to be similar, along with corresponding similarity levels, constituents, and classifications thereof, to generate corresponding revision recommendations. In various embodiments of the present invention, the revision recommendations may include, for example, suggestions as to revision of certain of the respective subconstituents of the query data, to more closely resemble those of the training data used to train the natural language understanding model. In the various embodiments, the revision recommendations may include, for example, various synonyms corresponding to respective subconstituents of the query data, to increase resemblance thereof with respect to those of the training data. The appropriate choice of the revision recommendations may be chosen as a matter of design choice, based, for example, on a given application at-hand.

Figure 4:
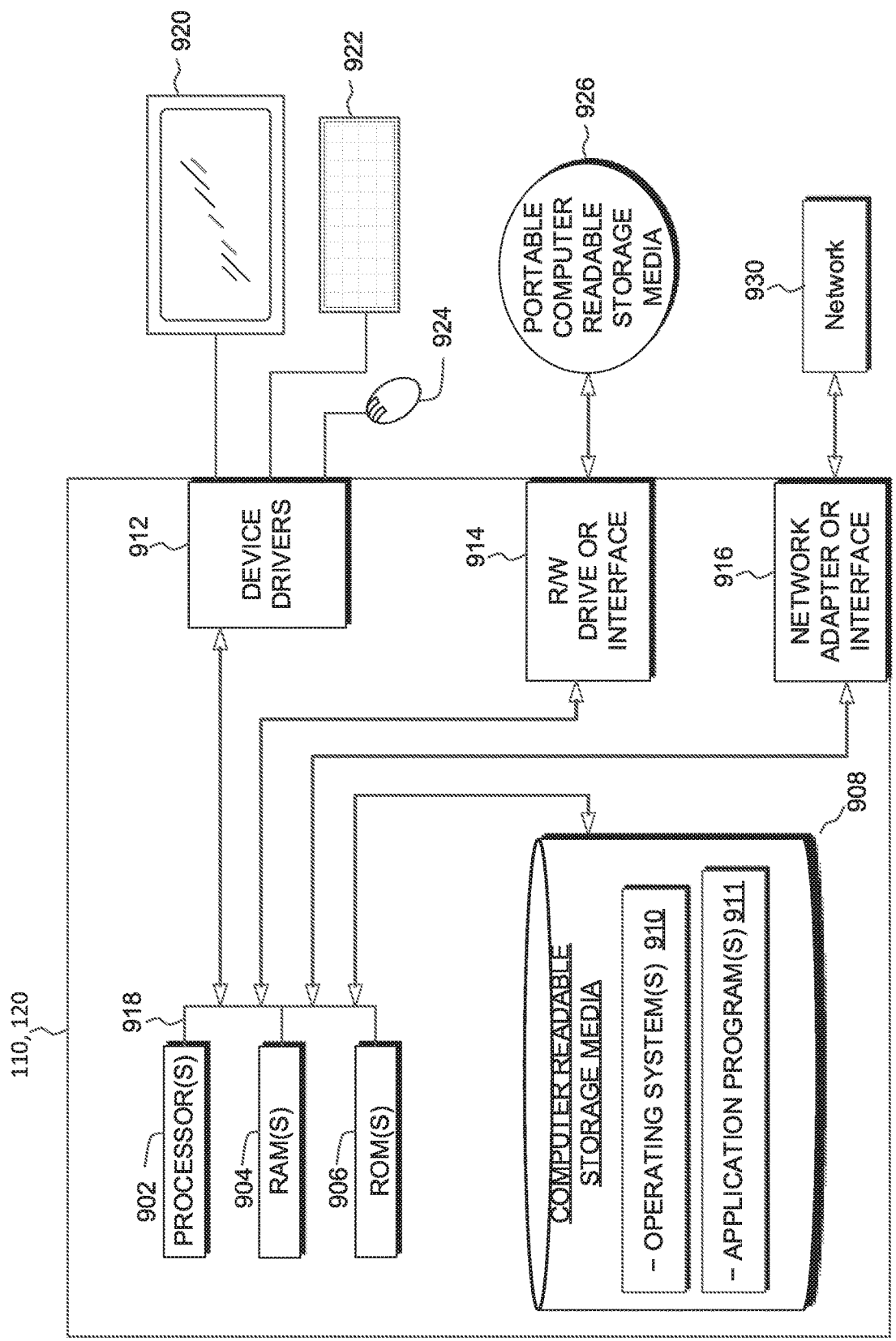
FIG. 4 is a block diagram depicting a user computing device and/or an interpretation management device, in accordance with an embodiment of the present invention.

FIG. 4 is a block diagram depicting user computing device 110 and/or interpretation management device 120, in accordance with an embodiment of the present invention.

As depicted in FIG. 4, user computing device 110 and/or interpretation management device 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as optimization program 130 residing on interpretation management device 120, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 110 and/or interpretation management device 120 may also include a R/W drive or interface 914 to read from and write to one or more portable computer readable storage media 926. Application programs 911 on user computing device 110 and/or interpretation management device 120 may be stored on one or more of the portable computer readable storage media 926, read via the respective R/W drive or interface 914 and loaded into the respective computer readable storage media 908. User computing device 110 and/or interpretation management device 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 220 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. User computing device 110 and/or interpretation management device 120 may also include a display screen 920, a keyboard or keypad 922, and a computer mouse or touchpad 924. In embodiments of the present invention, user computing device 110 may also include the sensor module 212. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Interpretation management device 120 can be a stand-alone network server, or represent functionality integrated into one or more network systems. In general, user computing device 110 and/or interpretation management device 120 can be a laptop computer, desktop computer, specialized computer server, or any other computer system known in the art. In certain embodiments, interpretation management device 120 represents computer systems utilizing clustered computers and components to act as a single pool of seamless resources when accessed through a network, such as a LAN, WAN, or a combination of the two. This implementation may be preferred for data centers and for cloud computing applications. In general, user computing device 110 and/or interpretation management device 120 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
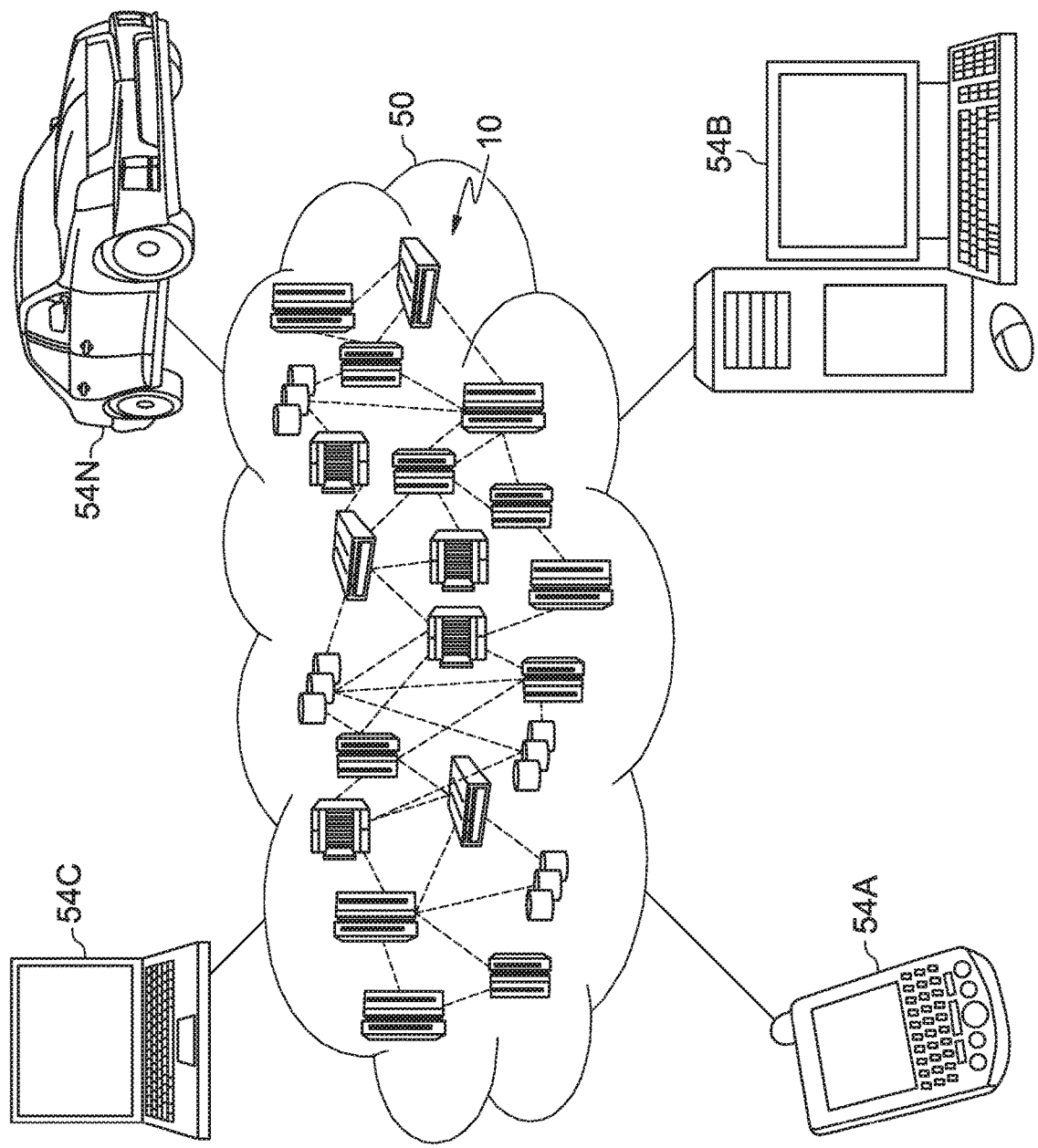
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
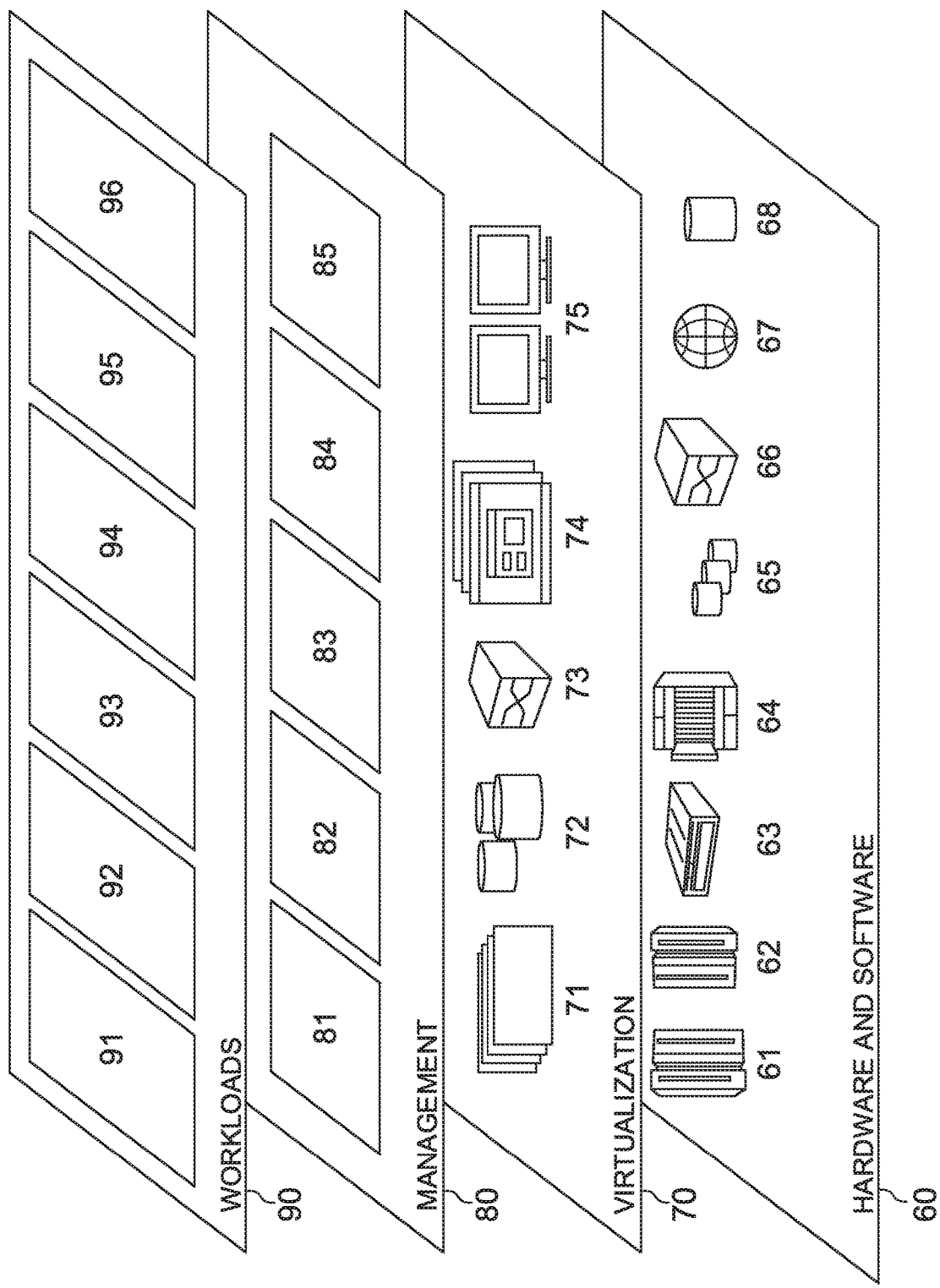
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Interpretation management 96.

Interpretation management 96 may include functionality enabling the cloud computing environment to be used to receive and analyze training data and query data, with respect to training a natural language understanding model, and to subsequently generate corresponding revision recommendations for reducing interpretation error in and by the natural language understanding model, respectively.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A method for natural language processing, the method comprising:
   detecting, by the computer system, invalid data comprised of one of training data and query data, wherein the training data comprises labeled constituents and corresponding classifications, and wherein a labeled constituent of the training data represents a constituent including a mapping as to which classification the constituent belongs, and wherein pairs of labeled constituents and corresponding classifications within the training data define desired constituent classification pairings, and wherein the invalid data comprises constituents of the training data that incorrectly define particular constituent classification pairings of the desired constituent classification pairings due to an incorrect mapping of a labeled constituent to a non-corresponding classification, and wherein the invalid data is further comprised of one or more n-grams, and wherein the incorrect mapping of the labeled constituent is a result of one or more subconstituents of the labeled constituent that resembles constituents or subconstituents of the non-corresponding classification;
   determining, by the computer system, an invalidity level of the invalid data, wherein the invalidity level comprises a discrepancy level that is determined with respect to the query data as a condition that an unlabeled constituent of the query data comprises an unknown subconstituent with respect to constituents of the training data, and wherein predefined criteria are met where the condition is not true;
   determining, by the computer system, an interpretation error risk level based on the invalidity level, wherein the interpretation error risk level represents a quantification of the likelihood that constituents or subconstituents of the training data or the query data may contribute to interpretation error;
   in response to determining, by the computer system, that the invalidity level meet the predefined criteria, generating, by the computer system, a revision recommendation corresponding to the predefined criteria that are met, wherein the revision recommendation quantifies an expected improvement of interpretation associated with particular constituents or subconstituents of the training data, and wherein quantifications of the expected improvement of interpretation comprise a relative count of interpretation errors, relating to incorrectly mapped constituents caused by the training data, both before and after the revision recommendation is implemented;

displaying the revision recommendation; and receiving, by the computer system, a confirmation of revision implementation.

2. The method of claim 1, wherein the invalidity level comprises an ambiguity level that is determined with respect to the training data as a conditional probability that each of two constituents of the training data comprise respective classification labels, given that the two constituents further comprise a common and identical subconstituent, and wherein:

the predefined criteria are met where the conditional probability exceeds a predetermined threshold value.

3. The method of claim 1, wherein the invalidity level comprises a bias level that is determined with respect to the training data as a conditional probability that each of two constituents of the training data comprise respective classification labels, given that the two constituents further comprise a common and identical subconstituent, and wherein:

the predefined criteria are met where the determined conditional probability of one of the two constituents exceeds the determined conditional probability of the other.

4. The method of claim 1, wherein the invalidity level comprises a misclassification level that is determined with respect to the training data as a conditional probability that a constituent of the training data comprises a classification label, given that the constituent further comprise a unique subconstituent with respect to the training data, and wherein:

the predefined criteria are met where the conditional probability exceeds a predetermined threshold value.

5. A computer system comprising:

one or more processors, a memory coupled to at least one of the processors, a set of computer program instructions stored in the memory and executed by at least one of the processors to perform a method for natural language processing, the method comprising:

detecting, by the computer system, invalid data comprised of one of training data and query data, wherein the training data comprises labeled constituents and corresponding classifications, and wherein a labeled constituent of the training data represents a constituent including a mapping as to which classification the constituent belongs, and wherein pairs of labeled constituents and corresponding classifications within the training data define desired constituent classification pairings, and wherein the invalid data comprises constituents of the training data that incorrectly define particular constituent classification pairings of the desired constituent classification pairings due to an incorrect mapping of a labeled constituent to a non-corresponding classification, and wherein the invalid data is further comprised of one or more n-grams, and wherein the incorrect mapping of the labeled constituent is a result of one or more subconstituents of the labeled constituent that resembles constituents or subconstituents of the non-corresponding classification;

determining, by the computer system, an invalidity level of the invalid data, wherein the invalidity level comprises a discrepancy level that is determined with respect to the query data as a condition that an unlabeled constituent of the query data comprises an unknown subconstituent with respect to constituents of the training data, and wherein predefined criteria are met where the condition is not true;

determining, by the computer system, an interpretation error risk level based on the invalidity level, wherein the interpretation error risk level represents a quantification of the likelihood that constituents or subconstituents of the training data or the query data may contribute to interpretation error;

in response to determining, by the computer system, that the invalidity level meet the predefined criteria, generating, by the computer system, a revision recommendation corresponding to the predefined criteria that are met, wherein the revision recommendation quantifies an expected improvement of interpretation associated with particular constituents or subconstituents of the training data, and wherein quantifications of the expected improvement of interpretation comprise a relative count of interpretation errors, relating to incorrectly mapped constituents caused by the training data, both before and after the revision recommendation is implemented;

displaying the revision recommendation; and receiving, by the computer system, a confirmation of revision implementation.

6. The computer system of claim 5, wherein the invalidity level comprises an ambiguity level that is determined with respect to the training data as a conditional probability that each of two constituents of the training data comprise respective classification labels, given that the two constituents further comprise a common and identical subconstituent, and wherein:

the predefined criteria are met where the conditional probability exceeds a predetermined threshold value.

7. The computer system of claim 5, wherein the invalidity level comprises a bias level that is determined with respect to the training data as a conditional probability that each of two constituents of the training data comprise respective classification labels, given that the two constituents further comprise a common and identical subconstituent, and wherein:

the predefined criteria are met where the determined conditional probability of one of the two constituents exceeds the determined conditional probability of the other.

8. The computer system of claim 5, wherein the invalidity level comprises a misclassification level that is determined with respect to the training data as a conditional probability that a constituent of the training data comprises a classification label, given that the constituent further comprise a unique subconstituent with respect to the training data, and wherein:

the predefined criteria are met where the conditional probability exceeds a predetermined threshold value.

9. A computer program product, the computer program product comprising:

a computer readable storage medium having program instructions embodied therewith, the program instructions executable by a computer system to cause the computer system to perform a method for natural language processing, the method comprising:

detecting, by the computer system, invalid data comprised of one of training data and query data, wherein the training data comprises labeled constituents and corresponding classifications, and wherein a labeled constituent of the training data represents a constituent including a mapping as to which classification the constituent belongs, and wherein pairs of labeled constituents and corresponding classifications within the training data define desired constituent classification pairings, and wherein the invalid data comprises constituents of the training data that incorrectly define particular constituent classification pairings of the desired constituent classification pairings due to an incorrect mapping of a labeled constituent to a non-corresponding classification, and wherein the invalid data is further comprised of one or more n-grams, and wherein the incorrect mapping of the labeled constituent is a result of one or more subconstituents of the labeled constituent that resembles constituents or subconstituents of the non-corresponding classification;

determining, by the computer system, an invalidity level of the invalid data, wherein the invalidity level comprises a discrepancy level that is determined with respect to the query data as a condition that an unlabeled constituent of the query data comprises an unknown subconstituent with respect to constituents of the training data, and wherein predefined criteria are met where the condition is not true;

determining, by the computer system, an interpretation error risk level based on the invalidity level, wherein the interpretation error risk level represents a quantification of the likelihood that constituents or subconstituents of the training data or the query data may contribute to interpretation error;

in response to determining, by the computer system, that the invalidity level meet the predefined criteria, generating, by the computer system, a revision recommendation corresponding to the predefined criteria that are met, wherein the revision recommendation quantifies an expected improvement of interpretation associated with particular constituents or subconstituents of the training data, and wherein quantifications of the expected improvement of interpretation comprise a relative count of interpretation errors, relating to incorrectly mapped constituents caused by the training data, both before and after the revision recommendation is implemented;

displaying the revision recommendation; and receiving, by the computer system, a confirmation of revision implementation.

10. The computer program product of claim 9, wherein the invalidity level comprises an ambiguity level that is determined with respect to the training data as a conditional probability that each of two constituents of the training data comprise respective classification labels, given that the two constituents further comprise a common and identical subconstituent, and wherein:

the predefined criteria are met where the conditional probability exceeds a predetermined threshold value.

11. The computer program product of claim 9, wherein the invalidity level comprises a bias level that is determined with respect to the training data as a conditional probability that each of two constituents of the training data comprise respective classification labels, given that the two constituents further comprise a common and identical subconstituent, and wherein:

the predefined criteria are met where the determined conditional probability of one of the two constituents exceeds the determined conditional probability of the other.

12. The computer program product of claim 9, wherein the invalidity level comprises a misclassification level that is determined with respect to the training data as a conditional probability that a constituent of the training data comprises a classification label, given that the constituent further comprise a unique subconstituent with respect to the training data, and wherein:

the predefined criteria are met where the conditional probability exceeds a predetermined threshold value.

* * * * *